(12) United States Patent
Pruitt et al.

(10) Patent No.: US 6,477,793 B1
(45) Date of Patent: Nov. 12, 2002

(54) CYCLING SHOE

(75) Inventors: Andrew L. Pruitt, Boulder, CO (US); Carl Bird, Watsonville; Luke Fryer, Los Gatos, both of CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 09/552,450

(22) Filed: Apr. 18, 2000

Related U.S. Application Data

(60) Provisional application No. 60/197,891, filed on Apr. 17, 2000.

(51) Int. Cl.[7] ................................................. A43B 5/14
(52) U.S. Cl. .............................. 36/131; 36/103; 36/144
(58) Field of Search .......................... 36/103, 131, 104, 36/127, 144

(56) References Cited

U.S. PATENT DOCUMENTS

| | | | | |
|---|---|---|---|---|
| 2,052,115 A | * | 8/1936 | Shulman | |
| 2,616,190 A | * | 11/1952 | Darby | |
| 4,255,877 A | * | 3/1981 | Bowerman | |
| 4,266,553 A | * | 5/1981 | Faiella | |
| 4,287,675 A | * | 9/1981 | Norton et al. | |
| 4,578,882 A | * | 4/1986 | Talarico, II | |
| 4,620,376 A | * | 11/1986 | Talarico, II | |
| 4,754,561 A | * | 7/1988 | Dufour | |
| 4,907,355 A | * | 3/1990 | Allen et al. | |
| 5,086,576 A | * | 2/1992 | Lamson | |
| 5,822,889 A | * | 10/1998 | Ueda | |
| 6,189,242 B1 | * | 2/2001 | Lin | |

FOREIGN PATENT DOCUMENTS

| | | |
|---|---|---|
| EP | WO 97/09228 | 3/1997 |
| FR | 2 464 660 A | 3/1981 |
| FR | 2 620 412 A | 3/1989 |
| FR | 2 620 909 A | 3/1989 |

* cited by examiner

Primary Examiner—Ted Kavanaugh
(74) Attorney, Agent, or Firm—Knobbe, Martens, Olson & Bear, LLP

(57) ABSTRACT

Methods and apparatus for promoting an ergonomically proper leg and foot posture while cycling are disclosed. A cycling shoe has a rigid outsole with a heel portion, a forefoot portion forward of the heel portion, a toe portion forward of the forefoot portion, an upper surface and a lower surface. The lower surface has a pedal contact area underlying the forefoot portion. The pedal contact area defines a base plane, and the upper surface of the outsole is sloped laterally with respect to the base plane along substantially the entire width of the forefoot portion, at a predetermined varus-compensation angle.

7 Claims, 15 Drawing Sheets

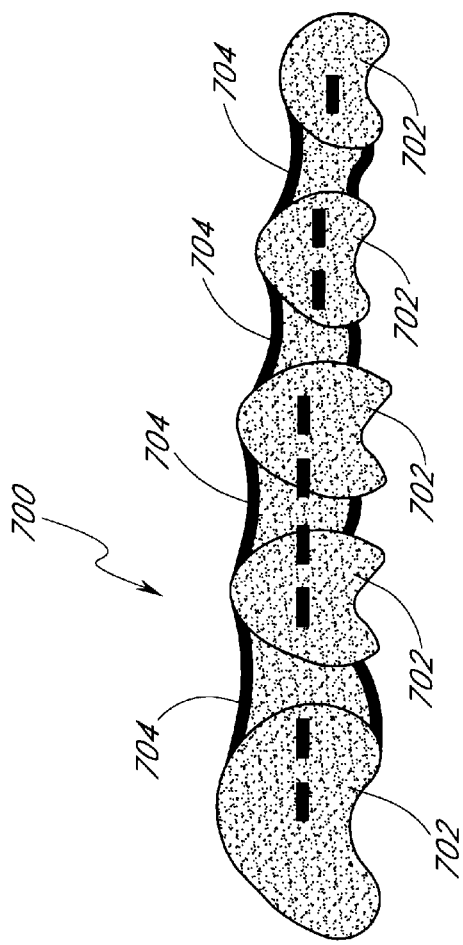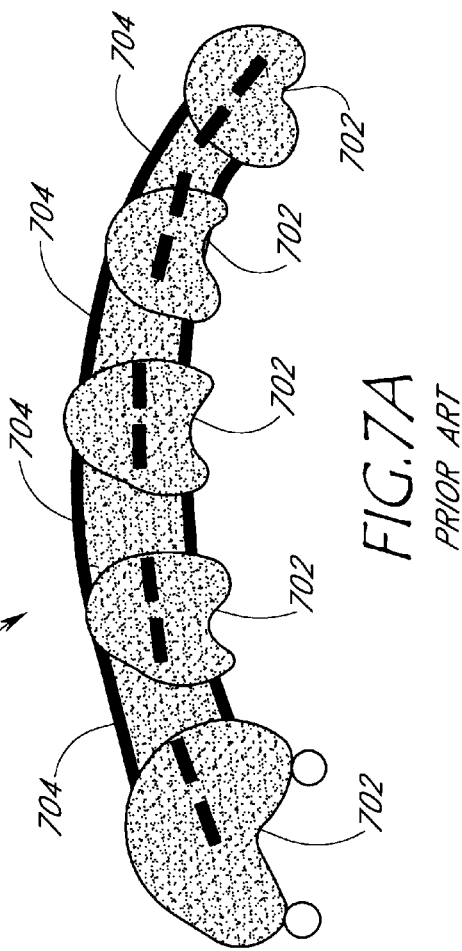
FIG.7A PRIOR ART
FIG.7B PRIOR ART

CYCLING SHOE

RELATED APPLICATIONS

This application claims the benefit of U.S. Provisional Application No. 60/197,891, filed Apr. 17, 2000, titled CYCLING SHOE.

BACKGROUND OF THE INVENTION

1. Field of the Invention

The present invention relates generally to the field of cycling footwear, and more particularly to a cycling shoe that is configured to improve a cyclist's leg posture when pedaling.

2. Description of the Related Art

FIG. 1 is a schematic partial front view of a typical human foot 100 having a hindfoot bone structure 102 and a forefoot structure consisting of a number of metatarsal bones 104. The alignment of the foot 100 is depicted while in a neutral (i.e., natural or resting) posture relative to a horizontal axis 106 and a vertical axis 108. The metatarsal bones 104 of the forefoot are shown tilted at an angle a with respect to the horizontal 106 while the hindfoot 102 is generally aligned along the vertical axis 108. This illustrates the natural "varus" tilt of the forefoot that is observed in 80%–90% of human feet while in the neutral posture. In other words, most of the human population has a slight natural tilt of the forefoot while the foot is at rest, as shown in FIG. 1. The varus tilt is typified by an elevated medial portion or instep of the foot, and a lowered lateral foot portion. In most persons, the natural varus angle is about 1.5°–5°.

FIG. 2 illustrates the effect of a varus forefoot on the motion and geometry of a bicycle rider's leg while pedaling a bicycle. A right leg 200 is shown with the foot 100 positioned on a pedal 202 that is situated horizontally, i.e. parallel to a flat ground surface. The right leg 200 also consists of an ankle joint system 204, a tibia 206, a fibula 208, a knee joint 210, a femur 212, a hip joint 214, and a pelvic bone 216. When the rider presses down on the pedal 202, the forefoot 104 is made to lay flat across the horizontal pedal 202, and the ankle joint system 204 responds by rotating the lower leg (tibia 206 and fibula 208) and tilting it in the medial direction. The femur 212 likewise tilts medially to follow the lower leg, and the rider assumes the "knock-kneed" posture shown in FIG. 2, during the downstroke portion of a pedaling motion. Although the varus tilt of the forefoot is typically at a very small angle (1°–2° in most people) the effect of this angle is multiplied by the length of the tibia 206 to create a significant and problematic deflection at the knee joint 210.

This leg posture is undesirable to a cyclist for several reasons. First, it can be a source of pain in the knee because the forced rotation of the lower leg imparts an axial torque stress on the knee 210, which cannot tolerate a large degree of axial torque. The torque stress is applied to the knee in combination with the repetitive, high-force knee flexion and extension observed when cycling, and thus can cause a rider to experience knee-joint pain that builds up over time. Furthermore, a cyclist typically experiences a loss of pedaling power when employing the leg posture shown in FIG. 2. Because the rider typically pulls up on the pedal 202 (via a toe clip or cleat system as discussed in greater detail below) during the upstroke portion of a pedaling motion, the leg 200 straightens out as the forefoot 104 is no longer forced against the horizontal pedal surface 202. The resulting alternation between medial bending and straightening of the leg 200 (as the leg 200 repeatedly progresses through downstroke and upstroke) causes the knee 210 to trace out a vertically-oriented oval pattern 218 shown in FIG. 2. This back-and-forth lateral motion of the knee while cycling represents a high degree of wasted motion and energy for the cyclist. The result is faster onset of fatigue and erosion of the rider's capability to apply power to the pedal 202.

FIGS. 3 and 4 depict the use of a wedge 300 to compensate for the natural varus forefoot posture. With the wedge 300 situated between the pedal 202 and forefoot 104, the leg 200 can assume the straight posture shown in FIG. 4 during both downstroke and upstroke, as the ankle joint, lower leg and femur no longer need to compensate for a deviation of the forefoot 104 from its natural varus posture. Thus the knee 210 traces out the desired straight-line pattern 220 as the rider pedals, with a minimum of the wasted motion, power loss, pain and fatigue associated with the poor leg posture depicted in FIG. 2.

FIGS. 5A and 5B depict a well-known pedal system 500 that includes a pedal 502 having a binding mechanism 504 that can receive a cleat 506 attached to the bottom of a cycling shoe 508 worn by the rider on each foot. The cycling shoe 508 has a relatively rigid outsole 510, and the cleat 506 is usually attached to the sole 510 under the ball of the rider's foot. Typically, each pedal 502 has contact surfaces 512 on either side of the binding mechanism 504 that contact the shoe outsole 510 when the rider pushes down on the pedal 502, to provide a wider shoe-to-pedal contact area and prevent the concentration of pressure under the rider's foot. This pedal system 500 provides superior cycling performance compared to pedals having toe clips or no foot attachment at all. This is because when "locked in" to the pedal 502 with the cleat 506, the rider can push or pull on the pedal 502 in virtually any direction as desired during the pedaling stroke, with minimal loss of power due to poor foot-pedal coupling. Thus with a cleat-and-pedal system the rider can apply a greater amount of power to the pedals over a larger portion of the pedaling stroke.

FIG. 5C shows a variation of the cleat-and-pedal system used with a mountain-bike shoe 550. The mountain-bike shoe 550 is similar in many respects to the standard or road-bike shoe 508 discussed above, with the addition of tread portions 552 on either side of the cleat 506 and elsewhere on the outsole 510. The tread portions 552 facilitate walking with or portaging a bicycle as is often necessary when cycling off-road. To prevent undue wear of or damage to the cleat 506, the tread portions 552 are made sufficiently tall to create a gap or clearance 554 between the cleat 506 and a ground surface 556. The clearance 554 assists in protecting the cleat 506 from damaging contact with a hard ground surface such as rocks, gravel or pavement as the rider walks in the shoes 550.

U.S. Pat. No. 5,860,330 to Code et al. teaches several embodiments of a system for incorporating varus-angular compensation into a cleat-and-pedal system. The first embodiment, depicted schematically in FIGS. 6A–6B, consists of one or more angled shims 600 that are placed between the outsole 510 of the rider's shoe 508 and the cleat 506. With the shims 600 installed, the cleat 506 is tilted with respect to the shoe outsole 510 so that when the rider mates the tilted cleat 506 with the pedal 502, the tilted cleat 506 is supposed to compensate for the varus angle in a rider's foot and promote the desired leg posture as shown in FIG. 4.

The shim system suffers from several drawbacks. First, when the cleat 506 is mated with the pedal 502, the angle created between the cleat 506 and the outsole 510 by the shim 600 prevents the outsole 510 from abutting both of the contact surfaces 512 of the pedal 502 (see FIG. 6B). Thus the contact area between the shoe 508 and the pedal 502 is reduced, which concentrates pressure upon the lateral aspect of the rider's foot when he bears down on the pedal 502. Such a pressure concentration causes foot discomfort and ultimately reduces the efficiency of power transfer to the pedal 502.

Furthermore, as seen in FIG. 7 the shim system taught by Code creates difficulty when used with the mountain-bike shoe 550. With the shim 600 in place, the lower edge of the cleat 506 extends very close to the ground surface 556, or even protrudes beyond the plane defined by the bottom edges of the tread portions 552. This arrangement exposes the cleat 506 to damage and wear from the resulting increased contact with the ground 556 as the rider walks in the mountain-bike shoe 550. Moreover, having been made more prominent by the addition of the shim 600, the cleat 506 concentrates pressure on the ball of the rider's foot as the rider steps on it while walking. The discomfort thus created can be a significant problem, as it is common for an off-road rider to walk his bicycle several hundred yards or more at a time when he must pass through areas that are either too difficult for bicycle travel or are deemed mandatory walking paths due to trail erosion, excessive pedestrian traffic, etc. Less frequently but significantly nonetheless, a serious rider's walking distances can extend into many miles when the rider's bicycle has sustained such excessive damage so as to be unrideable.

The second embodiment taught by Code comprises a cycling shoe with a plate hinged to the underside of the outsole beneath the ball of the rider's foot. The cleat is attached to the hinged plate, which is adjustable via a screw mechanism to set a varus-compensation angle for the cleat. Whether this adjustable-plate shoe is effective or not in promoting the desired leg posture for the rider, it suffers from several drawbacks that make it an unacceptable solution to the varus-angle problem. The Code shoe is likely to be very heavy, as it must incorporate extra parts such as a rigid plate, a hinge that attaches the plate to the outsole, a screw adjustment mechanism, etc., to an otherwise standard cycling shoe. It is well known that excessively heavy equipment is disfavored in the cycling industry. Moreover, the inclusion of these extra parts and mechanisms also makes the Code shoe likely to be delicate and unreliable, and difficult and expensive to manufacture as compared to a cycling shoe that lacks these additional parts.

Both the Code shoe and the shim system share an additional disadvantage in that both systems increase the distance between the shoe and the pedal axle, which reduces pedaling efficiency by magnifying the effects of those forces encountered in a pedaling downstroke that are not directed downward on the pedal. Thus, energy-robbing bending and torsional effects are undesirably magnified.

Another embodiment taught by Code and otherwise typical of the prior art is a pedal having a built-in varus-compensation angle that is either fixed or adjustable. As a general matter, building a tilt into the pedal as opposed to the shoe is not an economical solution for a cyclist who owns more than one bicycle, e.g. one owning a mountain bike and a road bike, or a "practice" bike and a "race" bike. Such a cyclist must then purchase a pedal set for each of his bicycles in order to facilitate the varus-compensation benefits for all of them. Where the desired tilt is built into a shoe, the cyclist need only purchase a single pair of shoes that is usable with all of the bicycles that he owns. With regard to pedals having a built-in varus angle adjustment device, such pedals are undesirable for the same reasons outlined above regarding the adjustable-angle shoe taught by Code. That is, they are likely to be heavy, unreliable, delicate, difficult to use and expensive to manufacture.

Other prior-art approaches to the varus-angle problem have restricted the solution to a relatively small proportion of the cycling population. Typically, there have been custom (and often heavy) equipment modifications that address the most extreme cases of forefoot varus. However, these solutions not only leave out most of the population but also require the knowledge, skill and expense of an orthopedic specialist. This represents a significant hassle and time commitment for the average cyclist who has a varus forefoot and can benefit significantly from corrective equipment. These average cyclists thus miss out on needed treatment because a sound, quick, easy-to-use "mass-market" solution does not exist.

FIG. 7A shows a front cross-section of a foot 700 including metatarsals 702 and interosseus muscles and ligaments 704. It can be seen that the foot 700 has a lateral arch configuration that helps the foot absorb vertical loads in the manner of a leaf spring. That is, when under load the lateral arch of the foot 700 compresses as shown in FIG. 7B. When the arch compresses in this manner, the interosseus muscles and ligaments 704 are stretched and forced to bear part of the load; repeated and/or prolonged stretching or loading of these structures can cause a condition known as "hot foot pain." This condition is common when cycling, as the lateral arch is repeatedly compressed under relatively heavy loads as the rider presses down on the pedals. Prior known cycling shoes did not incorporate any features tending to address the "hot foot pain" problem.

Thus, a cycling shoe that overcomes the limitations of the prior art is needed.

SUMMARY OF THE INVENTION

In accordance with one preferred embodiment a cycling shoe comprises a rigid outsole having a heel portion, a forefoot portion forward of the heel portion, a toe portion forward of the forefoot portion, an upper surface and a lower surface. The lower surface has a pedal contact area underlying the forefoot portion. The pedal contact area defines a base plane, and the upper surface of the outsole is sloped laterally with respect to the base plane along substantially the entire width of the forefoot portion, at a predetermined varus-compensation angle.

In accordance with another preferred embodiment a cycling shoe comprises an upper portion for attachment of the cycling shoe to the foot of a rider, a sole portion lasted to the underside of the upper portion, and a pedal contact area built into the sole portion. The sole portion has a lateral cross-section in the area that underlies the ball of the rider's foot and the lateral cross-section incorporates a wedge shape that tilts the rider's foot with respect to the horizontal at an invariable varus-compensation angle.

In accordance with still another preferred embodiment a method of improving a cyclist's leg posture while pedaling comprises interposing a sole of a cycling shoe between the cyclist's foot and a pedal of a bicycle. The sole has an upper surface that is laterally tilted with respect to the horizontal so that the cyclist's foot is correspondingly tilted when pedaling. The upper surface is tilted at an invariable varus-compensation angle.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which:

FIGS. 7A–7B are front cross-sectional views of the lateral arch of the foot, both unloaded and under load;

DETAILED DESCRIPTION OF THE PREFERRED EMBODIMENT

In the following detailed description of the preferred embodiment, numerous specific details are set forth in order to provide a thorough understanding of the present invention. It will be evident, however, to one of ordinary skill in the art that the present invention may be practiced without these specific details. Therefore, the invention should not be viewed as limited to the specific details disclosed herein.

Figure 1:
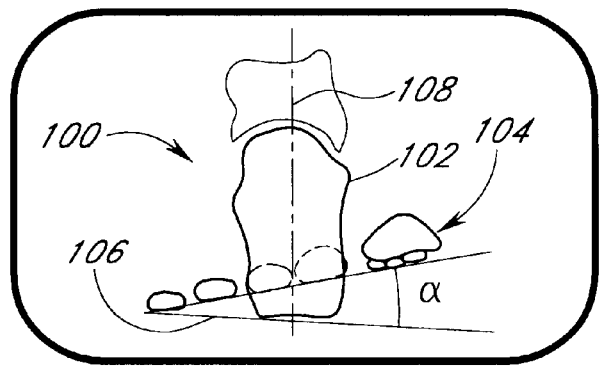
FIG. 1 is a front schematic view of the bones of the human foot, showing the natural varus angle commonly seen in the forefoot.
Figure 2:
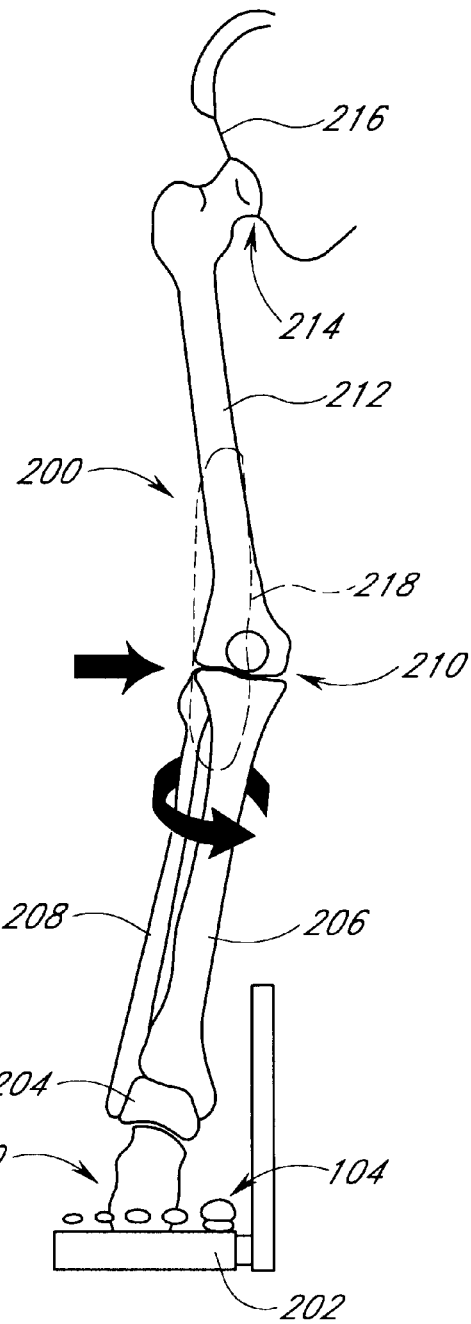
FIG. 2 is a front schematic view of the leg posture associated with cycling when suffering from a varus forefoot.
Figure 3:
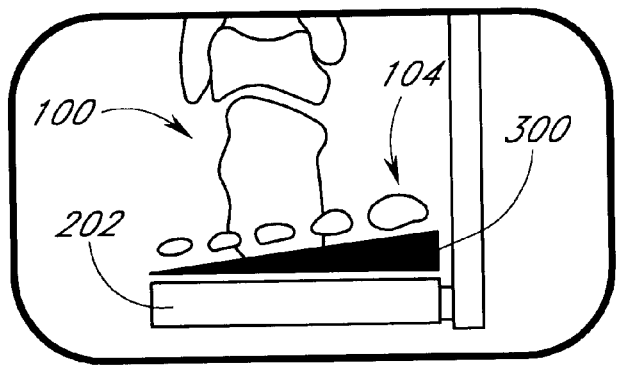
FIG. 3 is a front schematic view of the bones of the human foot, showing the natural varus angle of FIG. 1 and the interposition of a wedge to compensate for the varus.
Figure 4:
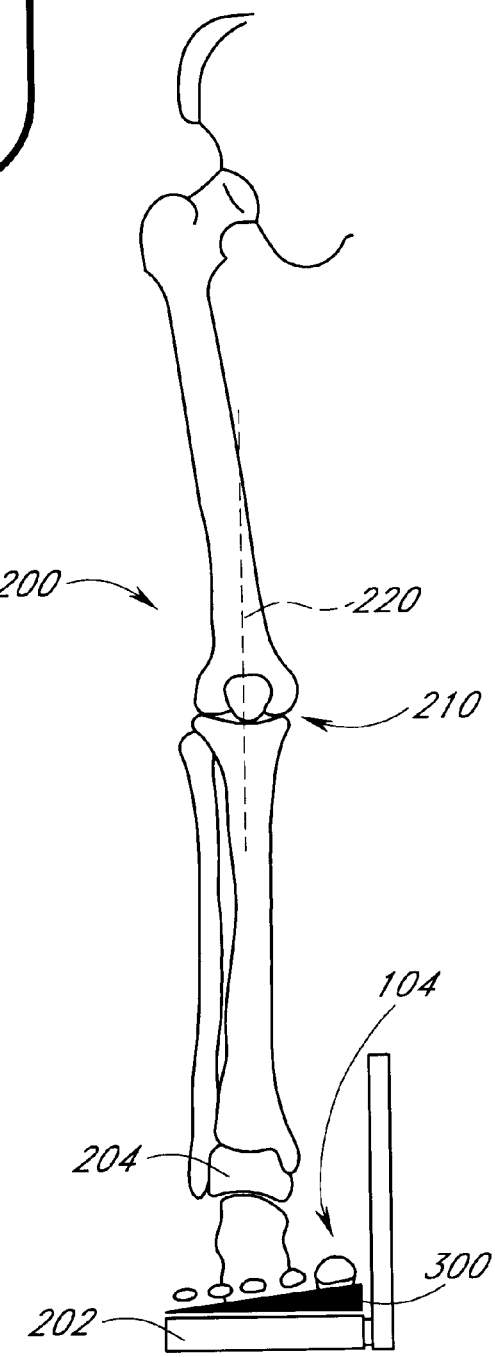
FIG. 4 is a schematic view of a corrected leg posture for a cyclist.
Figure 5A:
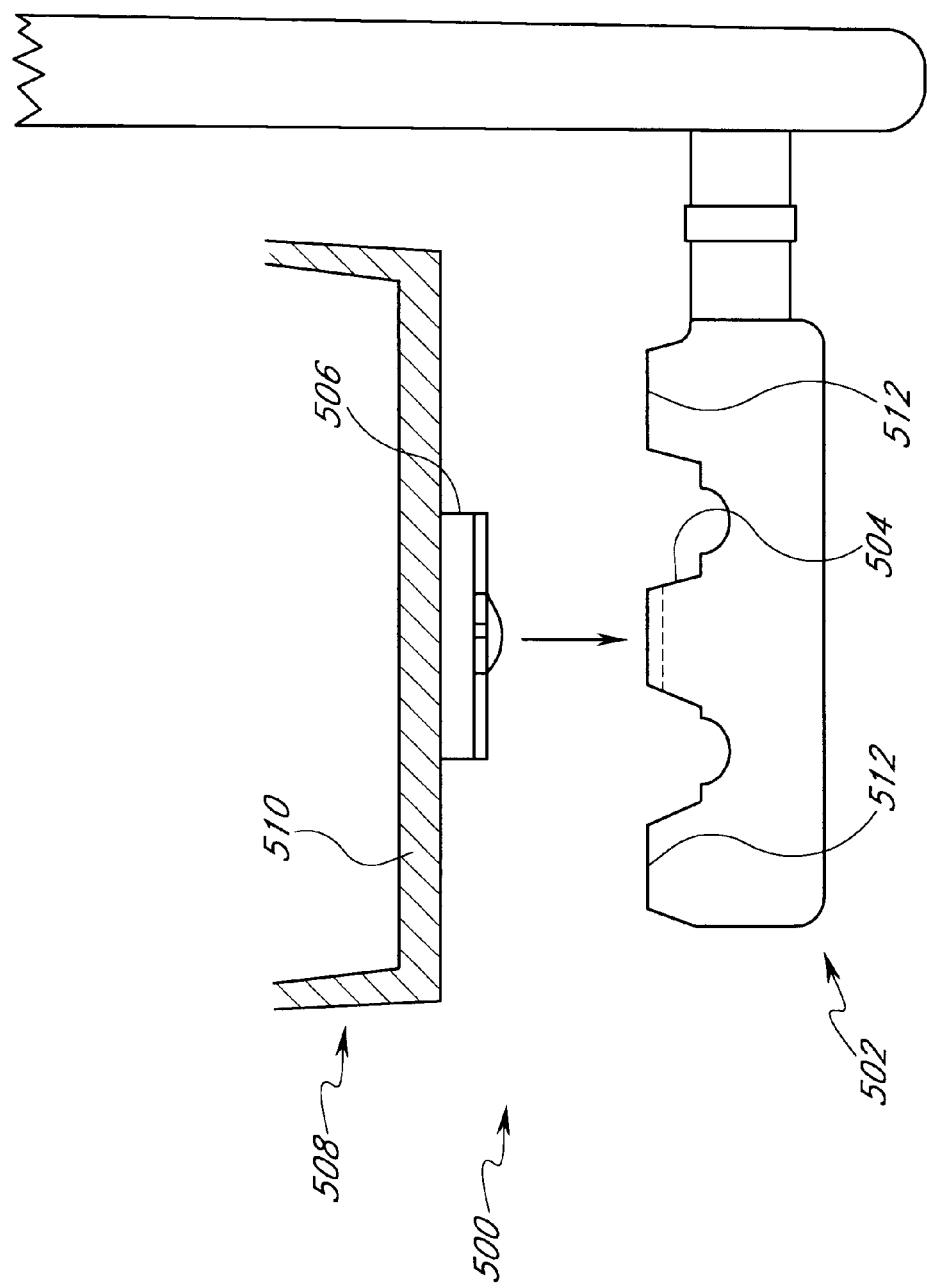
FIGS. 5A–5C are partial front cross-sectional views of a commonly-used cleat-pedal-system for a bicycle, incorporating variations for road bikes and mountain bikes.
Figure 5B:
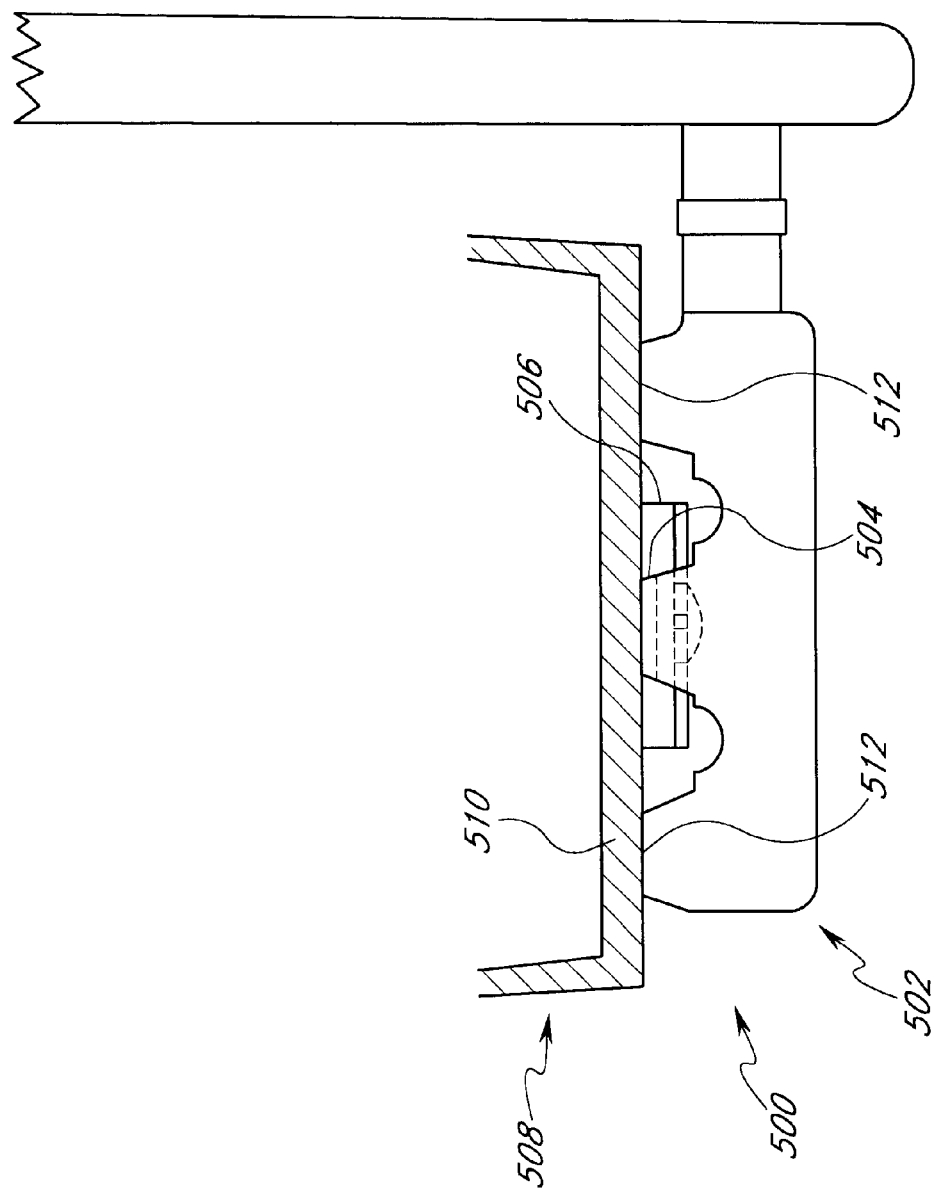
Figure 5C:
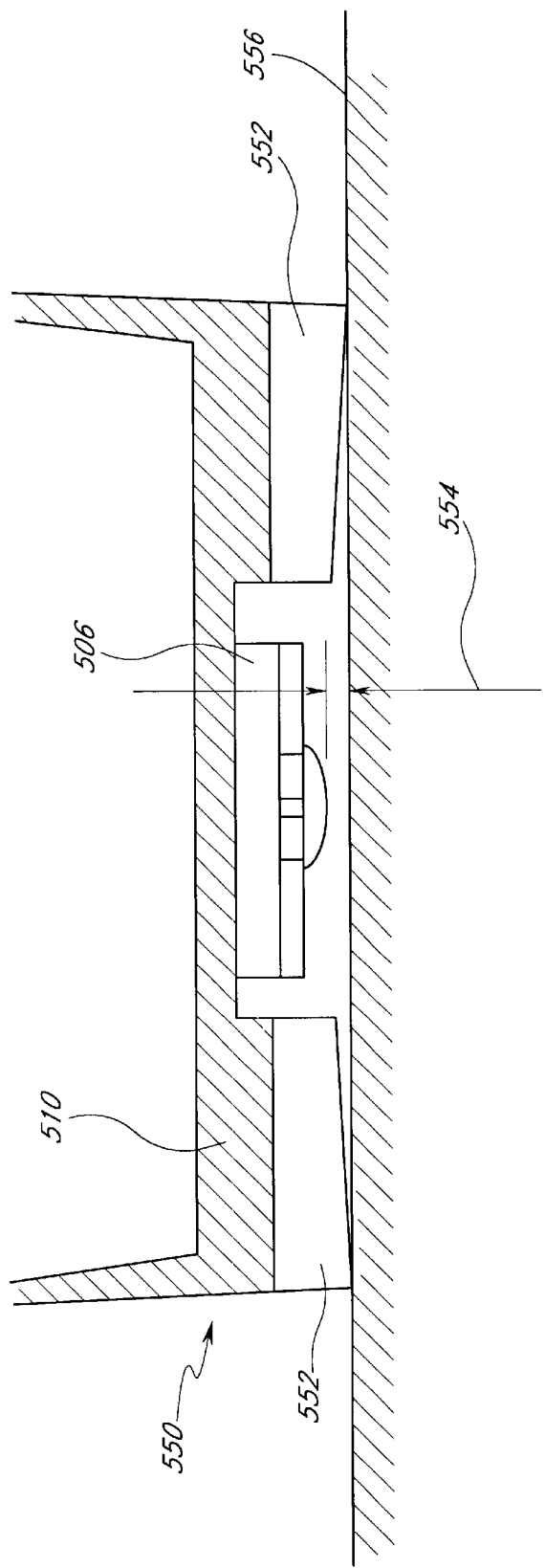
Figure 6A:
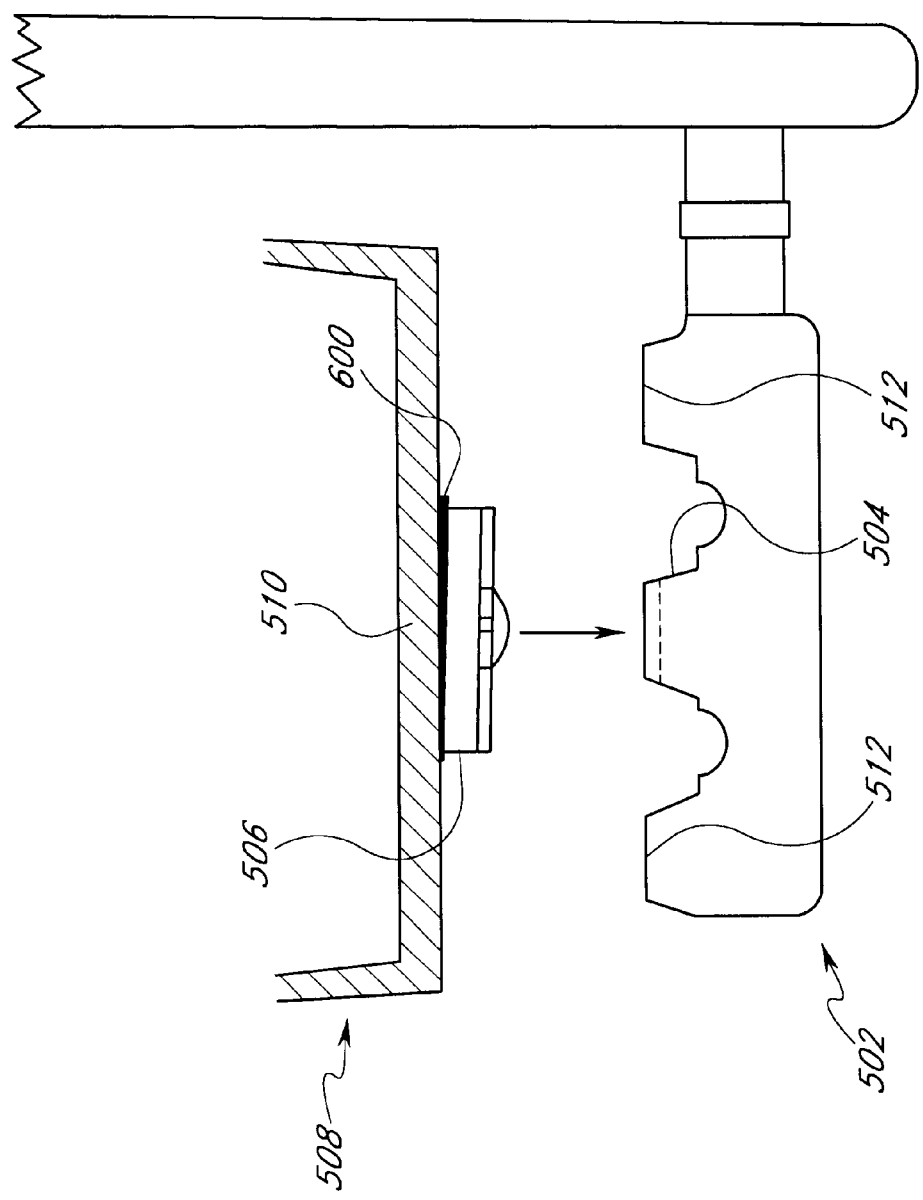
FIGS. 6A–6B show the cleat-and-pedal system of FIGS. 5A–5C, incorporating a known wedge system between the cleat and the shoe.
Figure 6B:
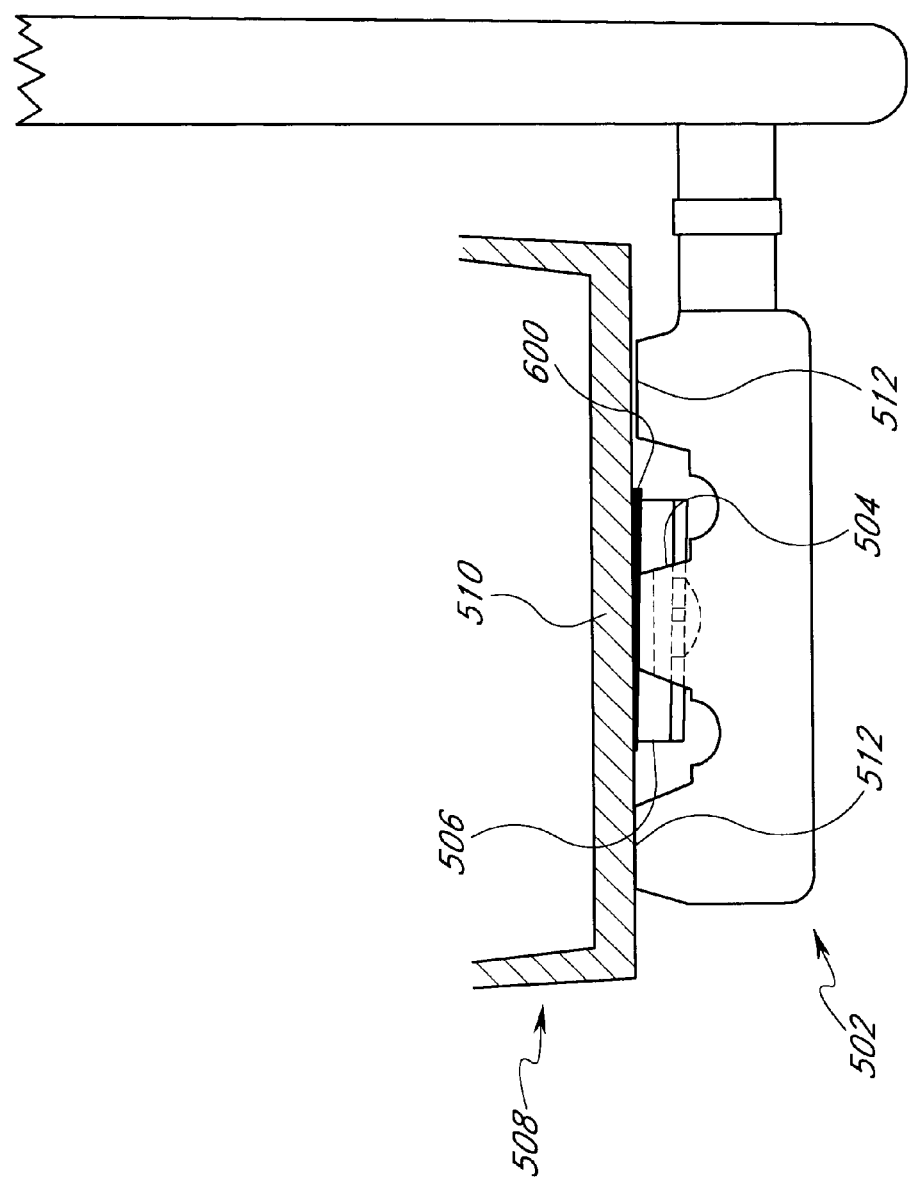
Figure 7:
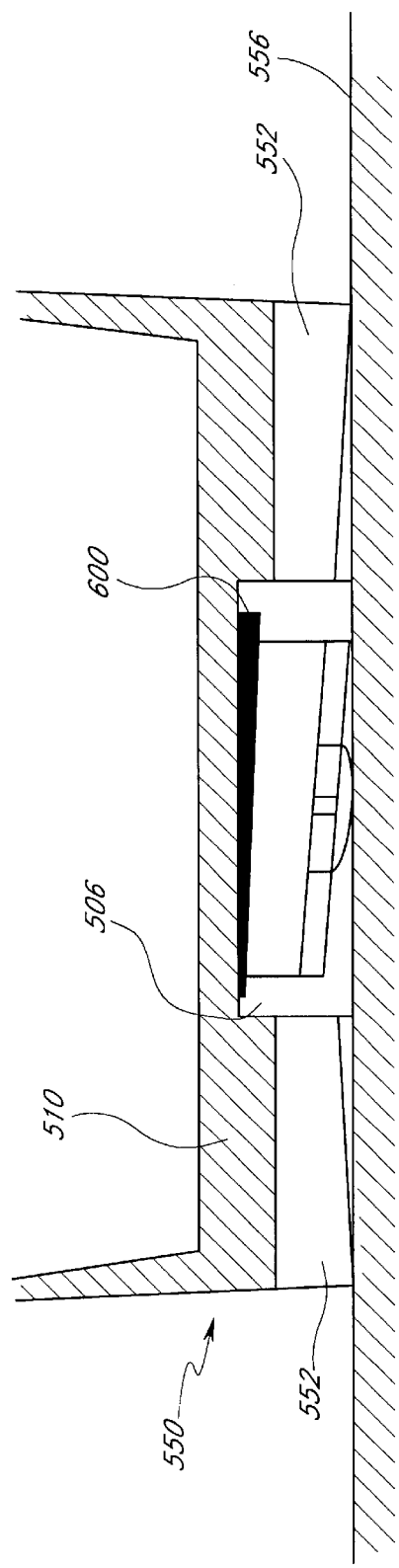
FIG. 7 shows the wedge system of FIGS. 6A–6B, as used with a mountain-bike shoe.
Figure 8:
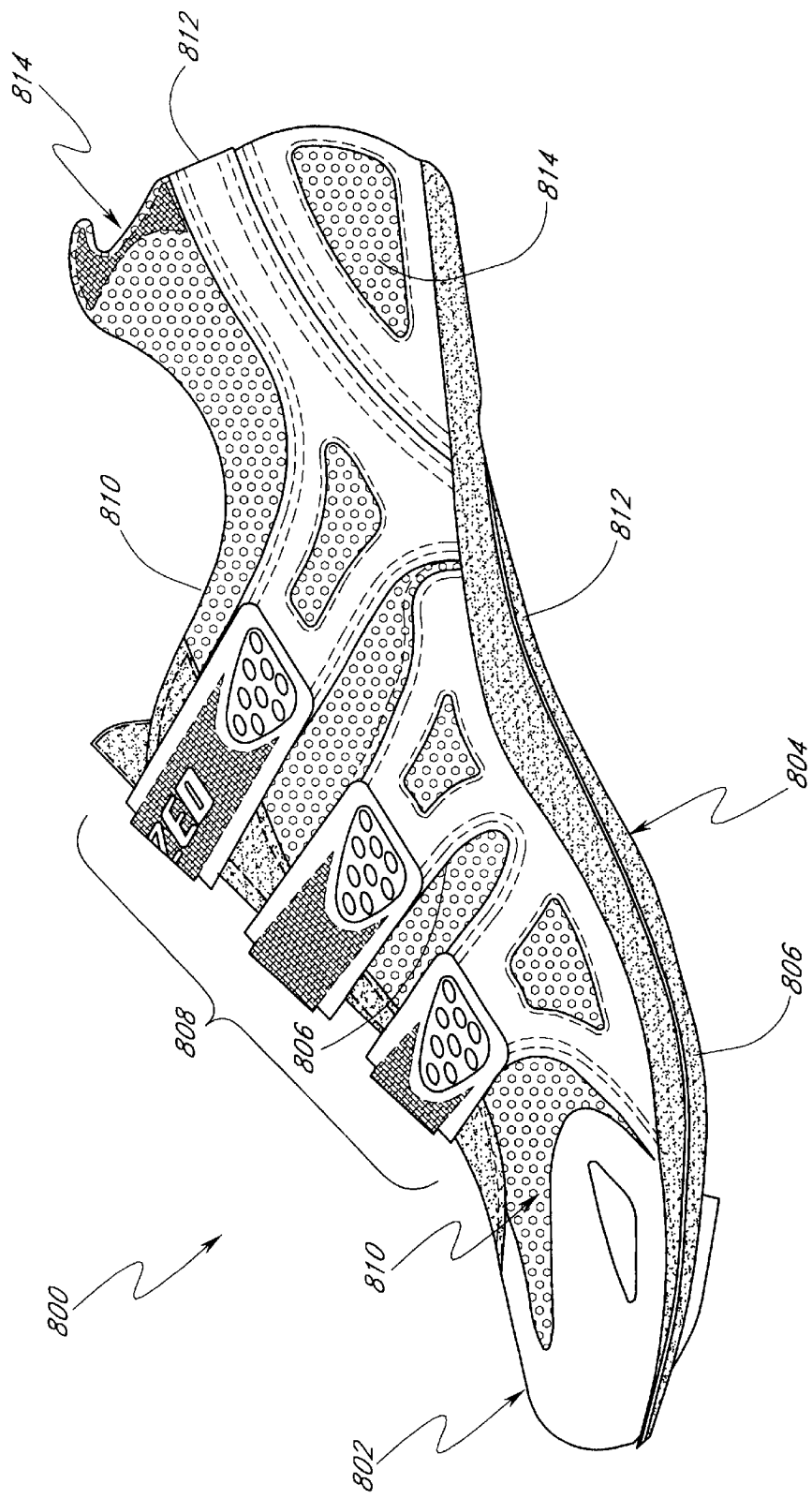
FIG. 8 is a side elevation view of a cycling shoe having features in accordance with one preferred embodiment of the invention.

FIG. 8 shows a cycling shoe 800 having features in accordance with one embodiment of the present invention. The cycling shoe 800 generally comprises an upper portion 802 and an outsole 804 that is lasted to the upper 802 portion using conventional techniques. The upper portion has a system of straps 806 that extend from the outsole 804 and anchor the outsole to the foot. The straps 806 preferably comprise a synthetic material such as nylon, but may alternatively comprise leather or canvas. The straps 806 incorporate or are connected to a fastening system 808, which comprises any of a number of fastener types known in the art, such as a series of straps with hook-and-loop fasteners, or a lace-up system, or some combination thereof. An upper fabric 810 underlies the straps 806 and preferably comprises a breathable fabric such as a nylon mesh. However, other suitable fabrics known in the art may be used as well.

The upper portion 802 also comprises a heel cage 812, preferably formed from injection-molded plastic or other strong, durable materials known in the art. The heel cage 812 provides a strong, resilient connection between the outsole 804 and the upper portion 802 near the heel, and thus promotes efficient power transmission between the foot and the pedal, by preventing the shoe 800 from sliding excessively on the rider's foot while pedaling. Furthermore, the heel cage 812 provides effective power transfer as the rider pulls back and/or up on the pedal during the upstroke.

To provide rider visibility and safety, reflectors 814 may be incorporated into the upper portion 802 as well.

FIGS. 9A–9G depict the outsole 804 in greater detail. The outsole 804 generally comprises a heel portion 850, a forefoot portion 852, and a toe portion 854; an upper surface 856 and a lower surface 858. The outsole 804 is preferably an integral unit that is molded from nylon and carbon fiber materials, or alternatively a rigid plastic such as ABS or PVC, using known techniques. The forefoot portion 852 has a pedal contact area 860 with a number of slots and/or openings 862 that facilitate connection of a cleat (not shown) to the outsole 804. As used herein, "pedal contact area" refers to a portion of the outsole can mount a cleat and supports the rider's foot above the pedal; an intervening finish layer (not shown) may be attached to the lower surface 858 of the outsole 804 to provide an aerodynamic lower surface for a road bike shoe, or a tread surface for a mountain-bike shoe, and thus prevent some or all physical contact between the outsole 804 and the pedal surface. Preferably, the forefoot portion 852 and the pedal contact area 860 are positioned to underlie the ball of the rider's foot when in use.

Referring specifically to FIGS. 9D–9G, it can be seen that the lateral (i.e. taken at right angles to the longitudinal axis of the outsole 804) cross-section of the outsole 804 varies in the relative orientation of the upper surface 856 to the horizontal (defined in further detail below). In particular, along most or all of the forefoot portion 852 and/or the toe portion 854 the upper surface 856 is laterally sloped or tilted with respect to the horizontal, at a varus-compensation angle 864. Preferably, this upper-surface slope or tilt extends across the substantially the entire width of the upper surface 856 in the forefoot portion 852 and at least part of the toe portion 854 and prevails along the entire pedal contact area 860. Importantly, this sloped forefoot portion desirably includes the forward end of the forefoot portion adjacent the toe portion (forward of the location of the metatarsal pad shown in FIG. 11A). In particular, it is advantageous that the upper surface 852 be sloped in substantially the entire area that underlies the ball of the rider's foot when pedaling.

Figure 9:
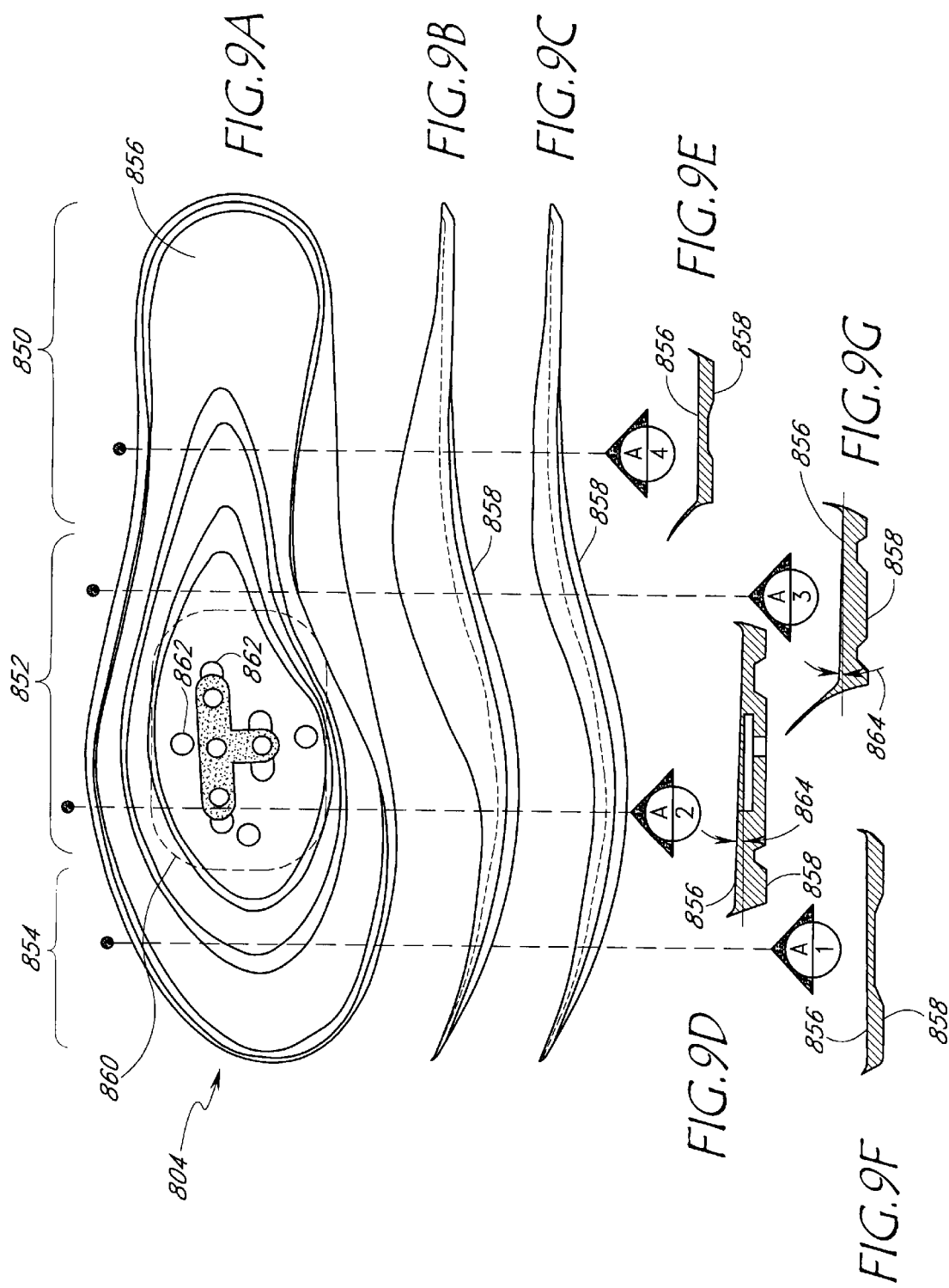
FIGS. 9A–9G are top, side elevation, and front cross-sectional views of an outsole for use with the cycling shoe of FIG. 8.

The slope is oriented such that the instep or medial portion of the rider's foot is raised slightly from the pedal, as compared to the lateral portion of the foot. Advantageously, the varus-compensation angle 864 is about 0.5°–6°; preferably the angle is about 1°–4°; most preferably the angle is about 1°–2°. Furthermore, it is preferred that the upper surface slope transitions gradually from the varus-compensation angle 864 in the pedal contact area 860, forefoot region 852 and/or toe portion 854 to increasingly shallow slopes in the areas adjacent the sloped portion of the upper surface. Thus this transition slope may extend into the heel portion 850 and the toe portion 854. As seen in FIG. 9E, in the remaining portions of the outsole 804 the upper surface 856 are substantially parallel to the lower surface 858.

Figure 10:
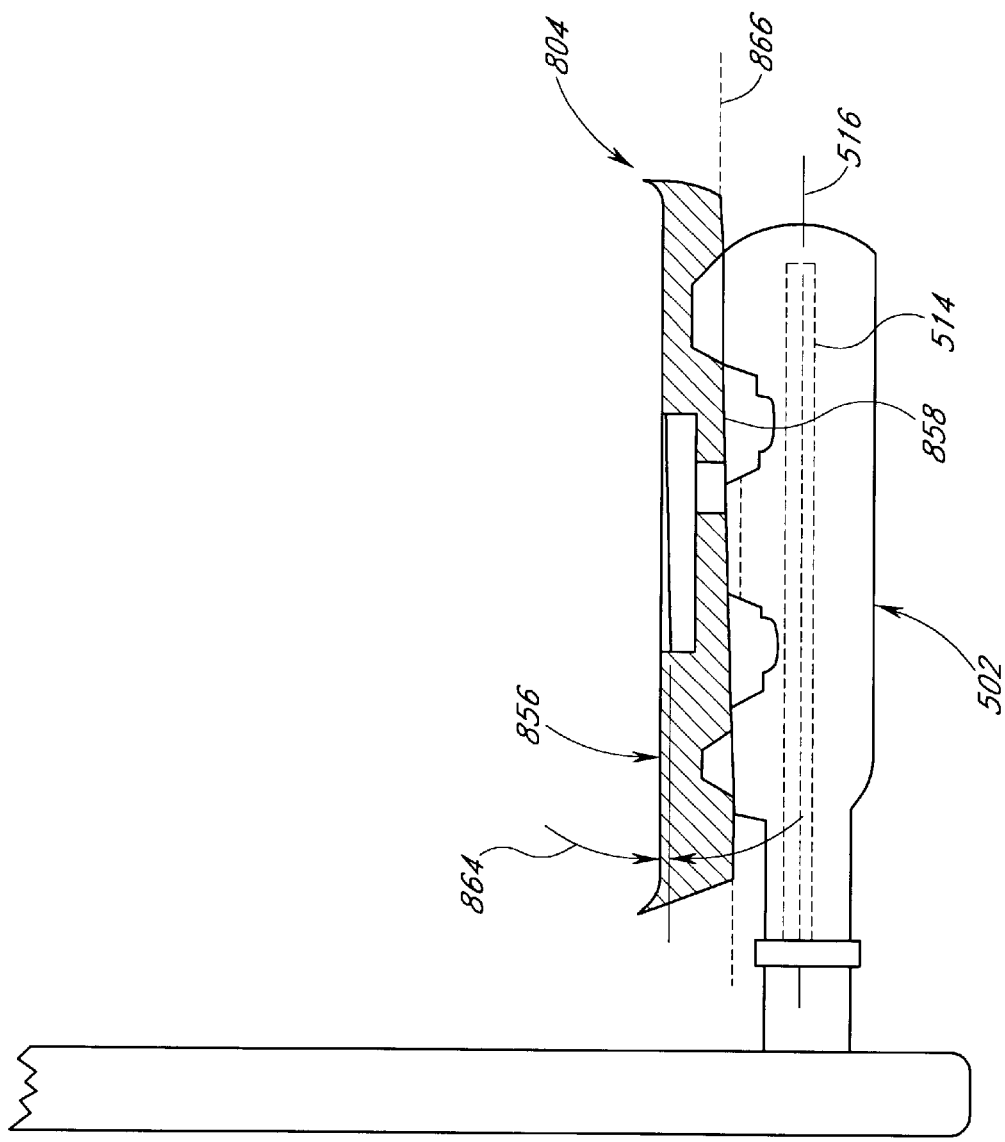
FIG. 10 is a front partial cross-sectional view of the outsole of FIGS. 9A–9G as used with a pedal system.

FIG. 10 shows the orientation of the upper surface 856 with respect to the pedal 502 when the cycling shoe is in use. For purposes of clarity, the cleat is not shown and the pedal 502 is shown with a pedal spindle 514 that has a pedal spindle axle 516. At the pedal contact area 860, the cleat and the lower surface 858 (and/or an intervening finish layer as discussed above) of the outsole 804 contact the pedal 502 along or tangent to a base plane 866, or along or tangent to a number of contact planes oriented parallel to the base plane 866, depending on the geometry of a particular shoe/cleat/pedal system. The base plane 866 extends parallel to the pedal spindle axis 516 and is thus always substantially horizontal in the lateral plane (the plane depicted in FIG. 10). However, the base plane 866 is not necessarily horizontal in the longitudinal direction (along the length of the cycling shoe, at right angles to the lateral plane), as the pedal and cycling shoe are free to rotate around the pedal spindle 514 while the rider pedals. As used herein, sloping or tilting the upper surface 856 or some other part of the cycling shoe "with respect to the horizontal" means with respect to the horizontal base plane 866, as opposed to sloping or tilting in the longitudinal direction. Thus, as described herein, parts of the cycling shoe, cleat or pedal that are "horizontal" or "oriented horizontally" are substantially parallel to the base plane 866, but not necessarily horizontal in the longitudinal direction.

When the lower surface 858 (or other finish layer) of the outsole 804 and/or the cleat contacts the pedal 502, the lower surface 858 is thus oriented horizontally, parallel to the pedal spindle axis 514 and the base plane 866. The upper surface 856 of the outsole 804 is then sloped with respect to the horizontal by the varus-compensation angle 864, and provides a sloped bed on which the rider's foot rests or presses (either directly or through an intervening sock liner or insole) while the rider pedals. The upper surface 856 is sloped with respect to the horizontal along substantially the entire width of the outsole 504 in the forefoot area. In addition, the upper surface 856 is sloped laterally with respect to the horizontal, preferably at a substantially constant varus-compensation angle 864, throughout the length of the forefoot portion 852 (see FIGS. 9D, 9G). As discussed above, the sloped orientation of the upper surface 856 promotes the desired, ergonomically proper foot and leg posture for the bicycle rider, and increases power transmission, pedaling efficiency, and rider comfort.

The design of the cycling shoe 800 as disclosed herein facilitates this desired foot/leg posture while providing certain performance advantages as compared to the prior art. First, the outsole 804 permits the pedaling force to be transmitted from the foot to the pedal across a broad contact area between the foot and the outsole, and between the outsole and the pedal, thus eliminating pressure concentrations that lead to rider foot discomfort and other deleterious effects. In addition, the cycling shoe 800 permits the cleat to be mounted on the bottom of the outsole 804 such that both sides (medial and lateral) of the lower surface of the cleat are the same, standard distance from the outsole 804. In the case of a mountain-bike shoe, this feature eliminates the cleat wear and walking discomfort associated with a cleat that lacks sufficient ground clearance and "sticks out" on one or both sides beyond the tread on the bottom of this type of shoe.

Furthermore, the cycling shoe 800 provides the desired angled foot posture in a relatively simple, sturdy shoe design that is relatively easy and inexpensive to manufacture with existing techniques. With no additional mechanisms or moveable parts added to the shoe or pedal, the cycling shoe 800 is lightweight, reliable, and no more complex than needed. The angled position is provided without need for the user to adjust the desired angle and/or periodically check the adjustment, nor is the angle susceptible to falling out of adjustment over time. The cycling shoe 800 represents an economical solution for a rider, who can obtain the benefits of the angled foot posture without need to purchase a new pedal set for each of his bicycles. The cycling shoe 800 also permits the design distance between the shoe and the pedal to be maintained, and thus avoids the pedaling efficiency loss observed when the distance between the shoe and the pedal axle is increased.

The cycling shoe 800 is also a quick, easy-to-use solution that addresses the forefoot-varus problems encountered by most of the cycling population. That is, it helps those cyclists who do not have the skill or knowledge to address their performance-robbing varus forefoot. Furthermore, it is a solution for those whose varus is not so severe as to require the intervention of a specialist. With no trouble, investment of time or expertise, and with minimal cost the typical cyclist can use the cycling shoe 800 to address his varus forefoot and increase his cycling performance. In this regard, an important aspect of the present invention is that a forefoot compensation angle of 1–2 degrees will provide significant benefit to most riders, without creating problems associated with overcompensation. Thus, this aspect brings the advantages heretofore available only for those with sufficient funds or knowledge to the general riding population.

Figure 10A:
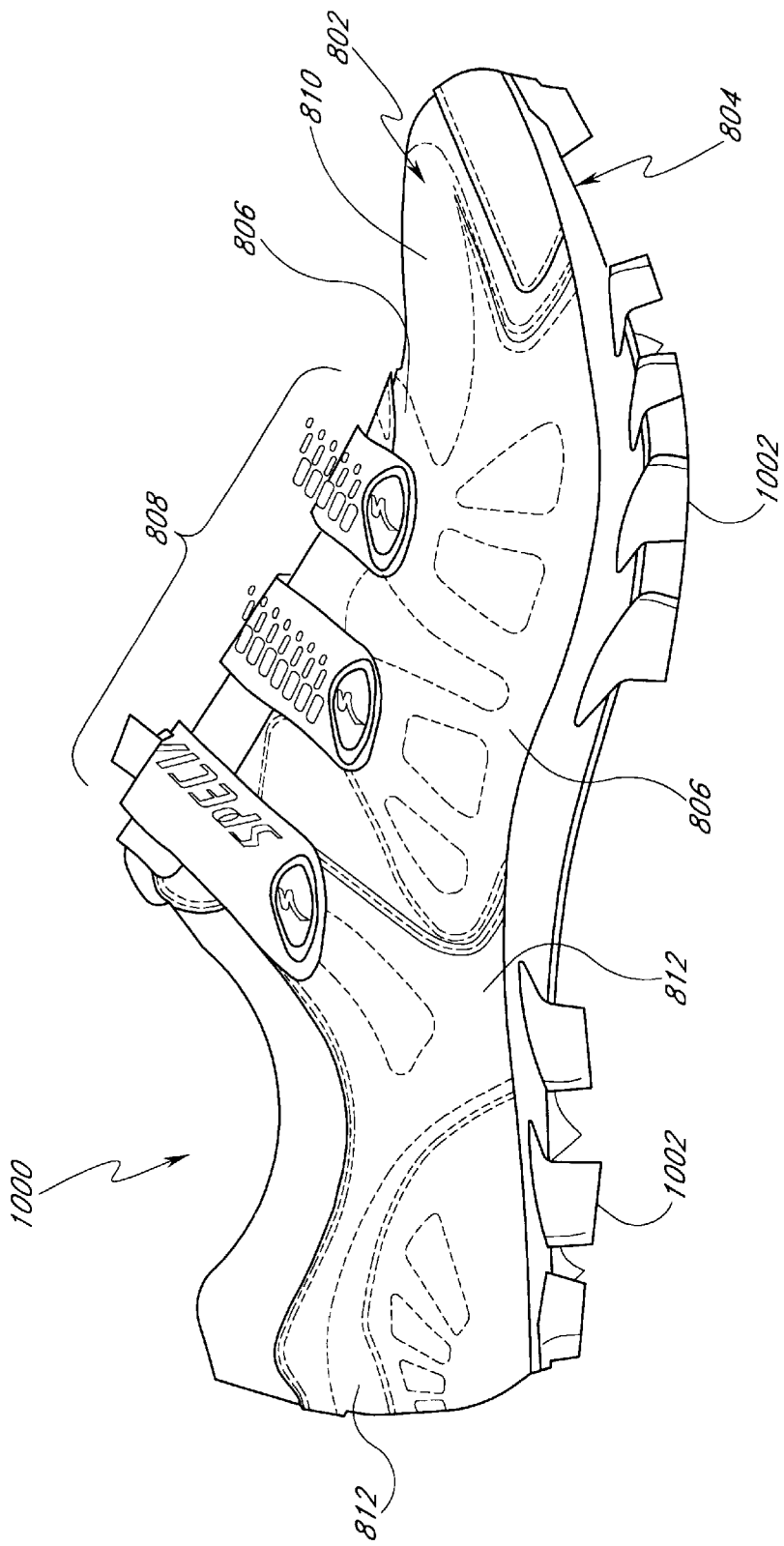
FIG. 10A is a side elevational view of a cycling shoe having features in accordance with another preferred embodiment of the invention.

FIG. 10A depicts an alternative embodiment 1000 of the cycling shoe, which incorporates some design aspects that make it suitable for use with mountain bikes, but is otherwise similar to the embodiment described above. In particular, this version of the shoe 1000 has a number of tread portions 1002 that extend from the outsole 804 (or a finish layer that covers the outsole 804). As discussed earlier, the tread portions 1002 facilitate easier footing for the rider when he must dismount the bicycle and walk alongside it.

Figure 11A:
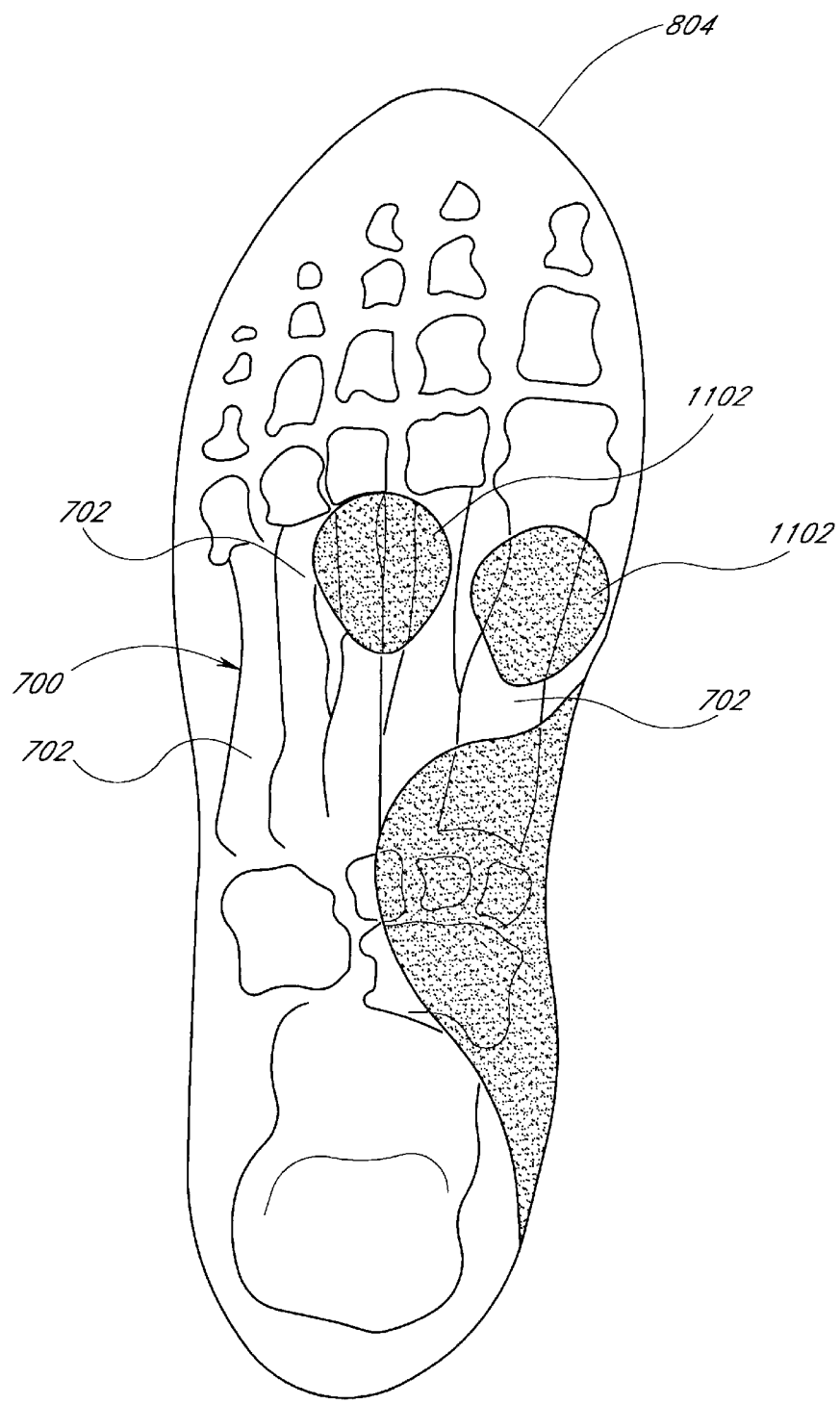
FIG. 11A is a plan view of the outsole of FIGS. 9A–9G.
Figure 11B:
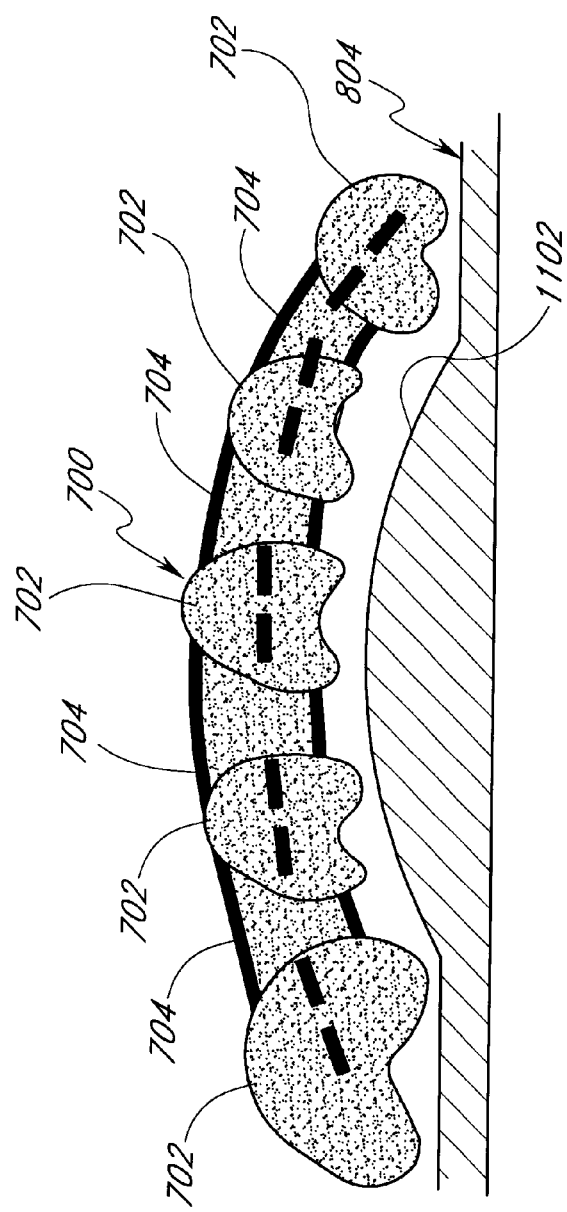
FIG. 11B is a front cross-sectional view of the outsole of FIG. 11A.

FIGS. 11A and 11B show an additional feature that is preferably incorporated into the outsole 804 and/or a sock-liner laid over the outsole 804, to enhance rider comfort. A metatarsal pad or button 1102 may be added, to underlie the lateral arch of the foot 700 (see FIG. 11B) and alleviate the problems associated with "hot foot pain." The metatarsal pad 1102 is preferably situated to underlie the second, third and fourth metatarsals 702 rear of the metatarsal heads and assists the lateral arch in maintaining its arch configuration under load. The task of maintaining the arch is thus transferred from the interosseus muscles and ligaments 704 to the metatarsal pad 1102, significantly relieving hot foot pain. Preferably, the pad 1102 has a rounded profile and is 2–4 mm in height.

Although the present invention has been described with reference to specific exemplary embodiments, it will be apparent to those of ordinary skill in the art that various modifications and augmentations may be made to these embodiments without departing from the broader spirit of the scope of the present invention as set forth in the following claims.

What is claimed is:

1. A cycling shoe, comprising:
   an upper portion defining a space sized and shaped to receive a foot of a rider; and
   a molded rigid outsole connected to said upper portion, said outsole forming an integral unit comprising:
   a heel portion;
   a forefoot portion forward of said heel portion, at least a section of said heel portion and at least a section of said forefoot portion including a first raised flange along an inbound side of the outsole and a second raised flange along an outbound side of the outsole;
   a toe portion forward of said forefoot portion;
   a plurality of holes formed therein for connecting a cleat to said outsole; and
   an upper surface and a lower surface that has a pedal contact area underlying said forefoot portion, said pedal contact area defining a base plane, said upper surface of said outsole being sloped laterally with respect to said base plane along substantially the entire width of the forefoot portion, at a varus-compensation angle of 1–2 degrees.

2. The cycling shoe defined in claim 1, wherein the varus-compensation angle is substantially constant throughout the length of said forefoot portion.

3. The cycling shoe defined in claim 1, further comprising at least one metatarsal pad connected to or laid over said upper surface of said outsole.

4. The cycling shoe defined in claim 1, further comprising a cleat mounted to the lower surface of said outsole, the medial and lateral sides of a lower surface of said cleat being a substantially similar distance from said outsole.

5. The cycling shoe defined in claim 1, wherein said upper portion has a heel cage that is lasted to said outsole and encircles the heel and the upper middle of the foot.

6. The cycling shoe defined in claim 1, wherein said outsole is made of nylon materials.

7. The cycling shoe defined in claim 1, wherein said outsole is made of carbon-fiber materials.

\* \* \* \* \*

UNITED STATES PATENT AND TRADEMARK OFFICE
CERTIFICATE OF CORRECTION

PATENT NO.    : 6,477,793 B1
DATED         : November 12, 2002
INVENTOR(S)   : Andrew L. Pruitt et al.

It is certified that error appears in the above-identified patent and that said Letters Patent is hereby corrected as shown below:

<u>Title page,</u>
Item [56], References Cited, U.S. PATENT DOCUMENTS, insert:
-- 32,487 -         - Plumer
1,287,810 -         - Wojteck
1,608,125 -         - Jones
1,746,002 -         - Lobel
1,837,488 -         - Romero
2,081,474 -         - Burns
2,106,508 -         - Shaw
2,138,955 -         - Calvin
2,184,456 -         - Knapp
2,421,088 -         - Sims
2,518,649 -         - Tydings
2,585,692 -         - Scholl
2,786,282 -         - Falk
2,863,231 -         - Jones
2,917,849 -         - Scholl
3,063,457 -         - Bittner et al.
3,063,458 -         - Scholl
3,081,774 -         - Lelyveld
4,112,600 - 9/12/78 - Hayward
4,250,888 - 2/17/81- Riso et al.
4,979,318 - 12/25/90 - Cohen
5,174,052 - 12/29/92 - Schoenhaus et al.
5,345,701- 9/13/94 - Smith
5,746,011- 5/5/98 - Hedstrom
5,860,330 - 1/19/99 - Code et al.
5,933,984 - 8/10/99 - Carlson et al.
5,964,046 - 10/12/99 - Brooks --

UNITED STATES PATENT AND TRADEMARK OFFICE
CERTIFICATE OF CORRECTION

PATENT NO. : 6,477,793 B1
DATED : November 12, 2002
INVENTOR(S) : Andrew L. Pruitt et al.

It is certified that error appears in the above-identified patent and that said Letters Patent is hereby corrected as shown below:

<u>Title page cont'd,</u>
Item [56], FOREIGN PATENT DOCUMENTS, insert
-- 75,621 - - France
2,515,708 - 4/6/83 - EPO --

Signed and Sealed this

Twenty-seventh Day of January, 2004

JON W. DUDAS
*Acting Director of the United States Patent and Trademark Office*